United States Patent [19]
Gerwe et al.

[11] Patent Number: 5,897,292
[45] Date of Patent: Apr. 27, 1999

[54] APPARATUS AND METHOD FOR FORMING ARRAYS OF ARTICLES FOR PACKAGING

[75] Inventors: Thomas K. Gerwe; Gregory J. Erickson, both of Cincinnati, Ohio

[73] Assignee: The Procter & Gamble Company, Cincinnati, Ohio

[21] Appl. No.: 08/944,537

[22] Filed: Oct. 7, 1997

[51] Int. Cl.$^6$ .......................... B65G 57/00; B65G 47/24; B65G 47/26; B65G 25/00
[52] U.S. Cl. ................................... 414/798.4; 414/798.7; 198/374; 198/418.4; 198/429
[58] Field of Search ................................... 198/617, 374, 198/418.4, 429, 430; 414/798.4, 798.6, 798.7

[56] References Cited

U.S. PATENT DOCUMENTS

| | | |
|---|---|---|
| 3,552,736 | 1/1971 | Frick et al. . |
| 3,685,818 | 8/1972 | Burger et al. . |
| 3,822,528 | 7/1974 | Carlsson et al. . |
| 3,915,293 | 10/1975 | Melchiorre et al. ................ 198/617 X |
| 3,954,165 | 5/1976 | Snyder . |
| 3,961,697 | 6/1976 | Hartman et al. . |
| 4,018,432 | 4/1977 | Frick . |
| 4,022,456 | 5/1977 | Hooper et al. . |
| 4,074,508 | 2/1978 | Reid . |
| 4,106,260 | 8/1978 | King . |
| 4,141,193 | 2/1979 | Joa . |
| 4,209,960 | 7/1980 | Deutschländer et al. . |
| 4,307,800 | 12/1981 | Joa . |
| 4,325,475 | 4/1982 | Spalding . |
| 4,370,844 | 2/1983 | Degn et al. . |
| 4,374,559 | 2/1983 | Morton . |
| 4,394,898 | 7/1983 | Campbell . |
| 4,399,905 | 8/1983 | Lance et al. . |
| 4,650,173 | 3/1987 | Johnson et al. . |
| 4,717,375 | 1/1988 | Lundmark . |
| 4,731,977 | 3/1988 | Maekawa . |
| 4,771,589 | 9/1988 | Mueller et al. . |
| 4,776,148 | 10/1988 | Mingozzi . |
| 5,018,334 | 5/1991 | Guttinger et al. . |
| 5,074,096 | 12/1991 | Focke . |
| 5,081,823 | 1/1992 | van der Ent . |
| 5,174,089 | 12/1992 | Poloni . |
| 5,212,929 | 5/1993 | Castellan . |
| 5,218,813 | 6/1993 | Seidel . |
| 5,255,584 | 10/1993 | Fakler . |
| 5,280,694 | 1/1994 | Malow . |
| 5,295,939 | 3/1994 | Ferrari et al. . |
| 5,400,894 | 3/1995 | Smith ................................. 198/429 X |
| 5,465,824 | 11/1995 | Van Maanen . |
| 5,474,168 | 12/1995 | Leslie et al. . |

*Primary Examiner*—William E. Terrell
*Assistant Examiner*—K. W. Bower
*Attorney, Agent, or Firm*—Dinsmore & Shohl LLP

[57] ABSTRACT

A method of forming arrays of articles comprising providing a stacker having a plurality of compartments for receiving the articles, the stacker traveling along a closed loop path; transporting a plurality of the articles along a first path towards the stacker in sequential fashion; introducing a first portion of the articles into the compartments at a first inlet position located adjacent to the interior of the closed loop path; and removing an array of the articles from the stacker at a stripping location located downstream from the inlet position. An apparatus for performing this method is also provided.

25 Claims, 5 Drawing Sheets

APPARATUS AND METHOD FOR FORMING ARRAYS OF ARTICLES FOR PACKAGING

BACKGROUND OF THE INVENTION

1. Field of the Invention

The present invention relates to an apparatus and method for forming arrays of articles for subsequent packaging. More particularly, the present invention provides an array forming apparatus and method wherein the articles are positioned in the arrays in varying orientations.

2. Description of Related Art

Many consumer products or other articles are not of a uniform or symmetrical shape, and thus the packaging of these items can be problematic. If these products are not packaged in an optimal manner, package strength and integrity may suffer and an excessive amount of packaging material may be needed to compensate for such shortcomings. In addition, the resulting package may not be consumer-friendly. It is also usually desirable to load as many articles as possible into a package of a given size in order to minimize slack space. When the articles are not uniform in size, optimal packaging often requires that the articles be packaged in a non-uniform manner. Non-uniform packaging, however, is difficult to accomplish in an automated, mechanical production/packaging process.

One particular type of asymmetrical articles having unique packaging difficulties are absorbent articles such as diapers, adult incontinence pads, sanitary napkins and pantiliners. These products are often profiled, particularly diapers and adult incontinence pads, such that the crotch portion of the products is much thicker than the waist area due to the additional absorbent material placed near the likely areas of discharge. This difference in thickness is even more pronounced when diapers or incontinence pads are packaged, since each diaper or pad is typically folded in half prior to insertion into an outer package. In addition, the diapers or pads are usually compressed prior to insertion into the package, and differences in compressibility caused by the profiling of these products may create additional packaging difficulties.

Diapers, adult incontinence pads, and similar articles typically are produced in sequential fashion such that the articles leave the production area one after another along a conveyor system. In the case of diapers and adult incontinence pads, these products typically leave the production area lying flat on a moving transport device such as a conveyor belt. The diapers or pads are then folded in half, and then rotated to an upright position. In this upright position, the diapers or pads are transported serially with the folded nose portion (referred to herein as the proximal end) leading. The diapers or pads are then deposited into an array forming apparatus which compiles a predetermined number of diapers or pads into an array (or stack) for packaging purposes. This array forming apparatus, often referred to as a stacker or accumulator, converts a series of products advancing sequentially along a conveyor system into an array (or stack) comprising a plurality of the diapers or pads positioned side by side. The product array may then be advanced onward to further packaging steps. Exemplary stacking devices are shown in U.S. Pat. Nos 3,954,165, 4,325,475 and 5,474,168.

In the prior art methods, the diapers or pads of an array are arranged therein in an identical, side by side orientation. For example, each diaper present in an array leaving a stacker is typically in a nose forward orientation. The region of the array corresponding to the nose portions of the diapers therein will often be thicker due to profiling of the diaper core, and the compressibility of the array will not be uniform across due to the pad profiling. Prior art stackers, however, are generally incapable of providing arrays wherein the orientation of the articles alternates within the array.

The present invention provides an apparatus and method for producing arrays of products wherein each product of an array may have one of two distinct orientations, and the orientation of the articles within a particularly array may therefore be varied as desired.

SUMMARY OF THE INVENTION

It is an object of the present invention to provide an apparatus and method for producing arrays of articles wherein the articles of the array can have varying orientations.

It is another object of the present invention to provide an apparatus and method for producing arrays of articles wherein the articles of the array have alternating orientations.

It is yet another object of the present invention to provide an apparatus and method for producing arrays of articles having alternating orientations employing a stacker, wherein the articles are deposited into the compartments of the stacker along a substantially straight line path.

It is still another object of the present invention to provide a package of an array of articles such as diapers, wherein the articles are positioned within the array in alternating orientation.

In accordance with a preferred embodiment of the present invention, these and other objects may be provided by a method of forming arrays of articles comprising the steps of:

(a) providing a stacker having a plurality of compartments for receiving the articles, the stacker traveling along a closed loop path;

(b) transporting a plurality of the articles along a first path towards the stacker in sequential fashion;

(c) introducing a first portion of the articles into the compartments at a first inlet position located adjacent to the interior of the closed loop path; and (d) removing an array of the articles from the stacker at a stripping location located downstream from the inlet position.

Preferably, this method further comprises the step of introducing a second portion of the articles into the compartments at a second inlet position, such that the array comprises the first and second portions of the articles wherein the articles of the first portion are positioned in the array in an orientation opposite to that of the articles of the second portion.

The stacker preferably comprises a plurality of outwardly extending fingers traveling along the closed loop path, and wherein the compartments comprise the region between adjacent fingers. Each of the compartments has a first entrance, and at least a portion of the compartments further has a second entrance, such that the first portion of articles are introduced into the compartments through the second entrances and the second portion of articles are introduced into the compartments through the first entrances. Each article of the first portion may be introduced into a compartment by urging the article from the first path, completely through a compartment having both first and second entrances, and thereafter into another compartment located at the first inlet position. Each article of the first portion is preferably urged into a compartment located at the first inlet position by a conveyor system which transports the article through the interior of the closed loop path, while each article of the second portion is introduced into a compartment at a second inlet position which is upstream from the first inlet position along the closed loop path.

The stacker may further comprise an advanceable support to which some or all of the fingers are secured, wherein this advanceable support travels along the closed loop path in a plane different from the plane of travel of the fingers. The second entrances described above may therefore be defined by the region between adjacent fingers located proximally (i.e., adjacent) to the advanceable support, and the first entrances may be defined by the region between adjacent fingers located distally to the advanceable support. The advanceable support preferably comprises a chain, however other devices such as a belt may be employed. The array of articles may be removed from the stacker by urging the array out of the compartments through the first entrances. These methods are particularly suited for diapers and adult incontinence pads.

The present invention also provides an apparatus for performing the above methods comprising:

(a) a continuous stacker having a plurality of compartments for receiving the articles, the compartments advanceable along a closed loop path;

(b) a conveyor system for transporting a plurality of the articles into the compartments at a first inlet position located adjacent to the interior of the closed loop path; and (c) a stripper for urging an array of articles out of the compartments, the stripper located downstream of the first inlet.

At least a portion of the compartments have first and second entrances, and the conveyor system is configured such that an article which is urged into a compartment through its first entrance and thereafter out of the compartment through its second entrance will be presented to the conveyor system for transport to the first inlet position. A portion of the fingers are each attached to an adjacent finger, such that each compartment defined by the region between adjacent fingers which are attached to one another lacks the second entrance. The fingers are preferably attached to an advanceable support by means of an offset bracket, thereby ensuring that the plane of travel of the fingers is different from that of the advanceable support. The second entrances may therefore be defined by the region between adjacent fingers located proximally to the advanceable support, and the first entrances by the region between adjacent fingers located distally to the advanceable support. The conveyor system is then configured so as to transport the articles into the compartments at the first inlet position through the second entrances.

The conveyor system preferably comprises a pair of advanceable belts positioned in facing relationship along a portion of their lengths, such that the articles may be transported to the first inlet position between the belts. The conveyor system is also preferably positioned so as to transport the articles through at least a portion of the interior of the closed loop path. The stripper is configured so as to urge the articles out of the compartments through the first entrances. The stripping location should be located downstream from both of the inlet positions.

BRIEF DESCRIPTION OF THE DRAWINGS

While the specification concludes with claims particularly pointing out and distinctly claiming the present invention, it is believed that the same will be better understood from the following description read in conjunction with the accompanying drawings in which:

DESCRIPTION OF THE PREFERRED EMBODIMENTS

While the present invention is particularly suited for forming arrays of diapers, adult incontinence pads, sanitary napkins and pantiliners for subsequent packaging, the apparatus and methods of the present invention can be employed for any of a variety of articles of which it is desirable to form arrays. Therefore, it is not intended that the scope of the present invention be limited to apparatus and methods for these products only, and, for purposes of clarity, the detailed description of the preferred embodiments which follows will be described using diapers only as an exemplary article.

Figure 6:
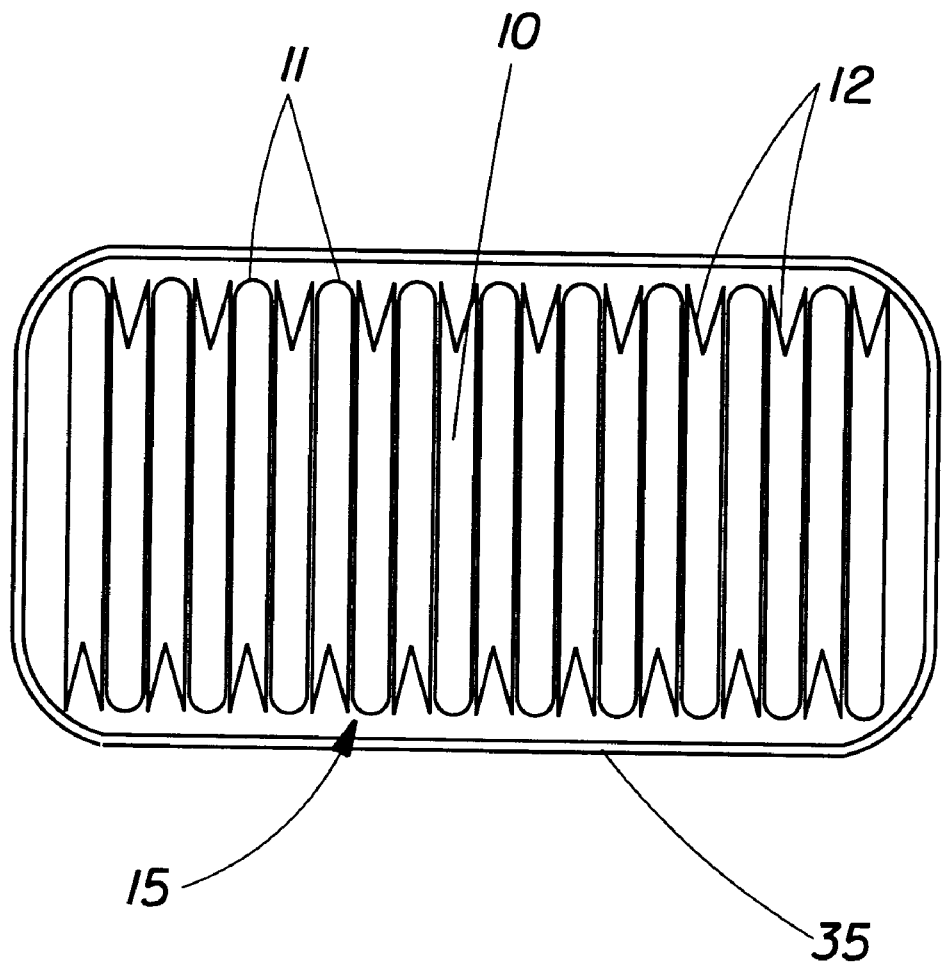
FIG. 6 is a schematic view of a bag of diapers comprising an array formed using the apparatus and methods of the present invention.

Diapers are typically profiled as described above (nose portion thicker than the tail portion), and prior art array forming methods produced arrays having aligned diaper orientations (e.g., nose portions positioned adjacent each other). This results in one end of the array being significantly thicker than the other, thereby resulting in inefficient packaging. FIG. 6 is a top plan, schematic view of a container 35 having an array 15 of diapers 10 therein produced using the apparatus and methods of the present invention. Container 35 typically comprises a flexible, polymeric bag, and may even contain a plurality of arrays 15 which have been compiled using the apparatus and methods of the present invention (i.e., a "double-stack" package). Each diaper 10 has a nose portion 11 and a tail portion 12, and the diapers of the array are provided in alternating orientations. In other words, the nose portion of a diaper is positioned next to the tail portion of an adjacent diaper.

The configuration of array 15 in FIG. 6 essentially cancels out variations in diaper thickness. The result is that bag size can be reduced for a given number of diapers, or alternatively more diapers can be fit into a bag of given size, since arrays of diapers in the non-aligned orientation of FIG. 6 can be compressed to a significantly greater extent than those having an aligned orientation. Bag appearance is also improved, as unsightly bulges will be eliminated. Just as importantly, Applicants' testing has shown that when diapers are packaged in the non-aligned orientation of FIG. 6, the packages provide a much more uniform reaction to a load. When such diaper packages are stacked onto pallets, the resulting load is much more stable than those prepared according to the prior art, thereby inhibiting pallet droop, product damage and the like.

Figure 1:
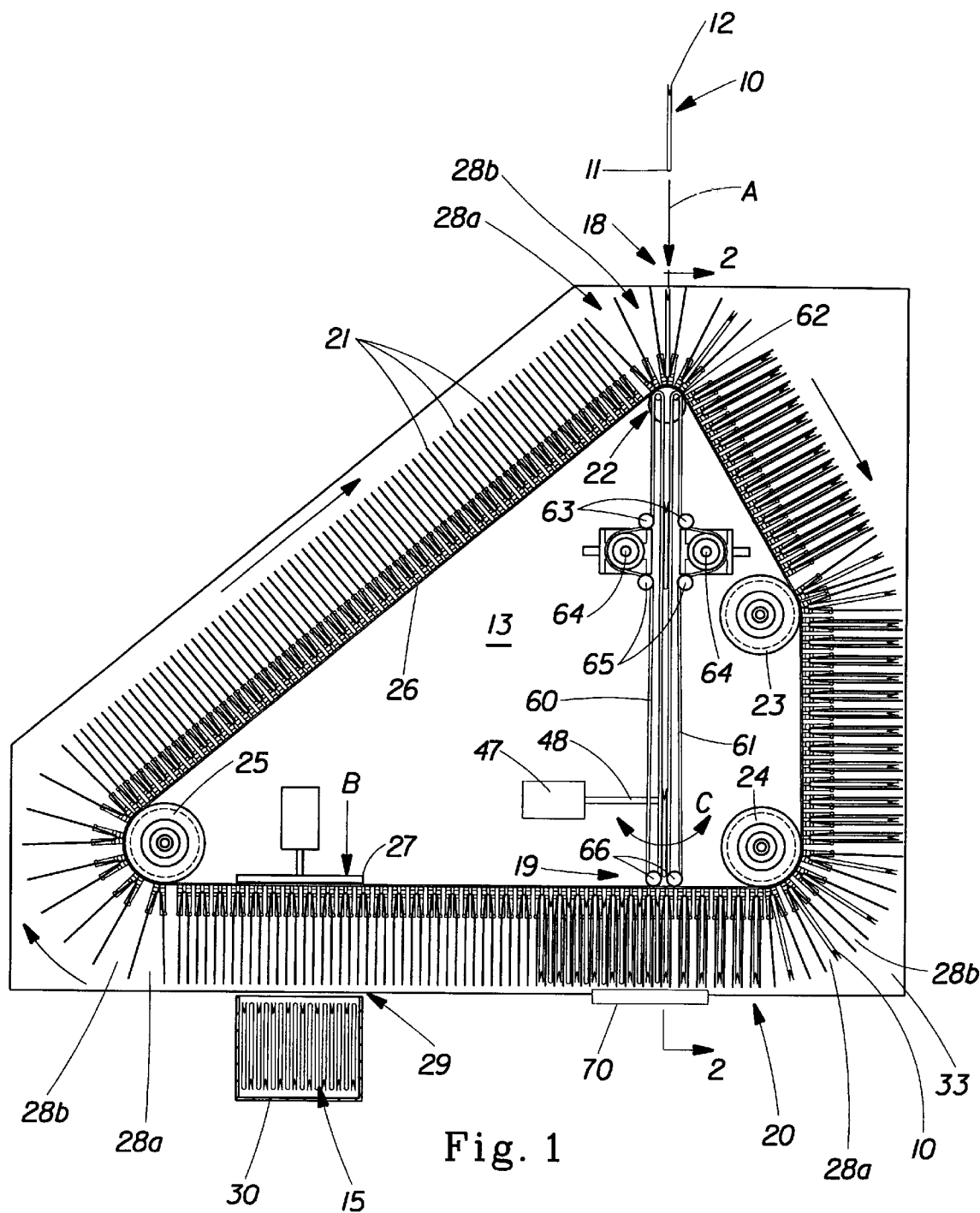
FIG. 1 is a top plan, schematic view of one embodiment of the apparatus of the present invention.
Figure 2:
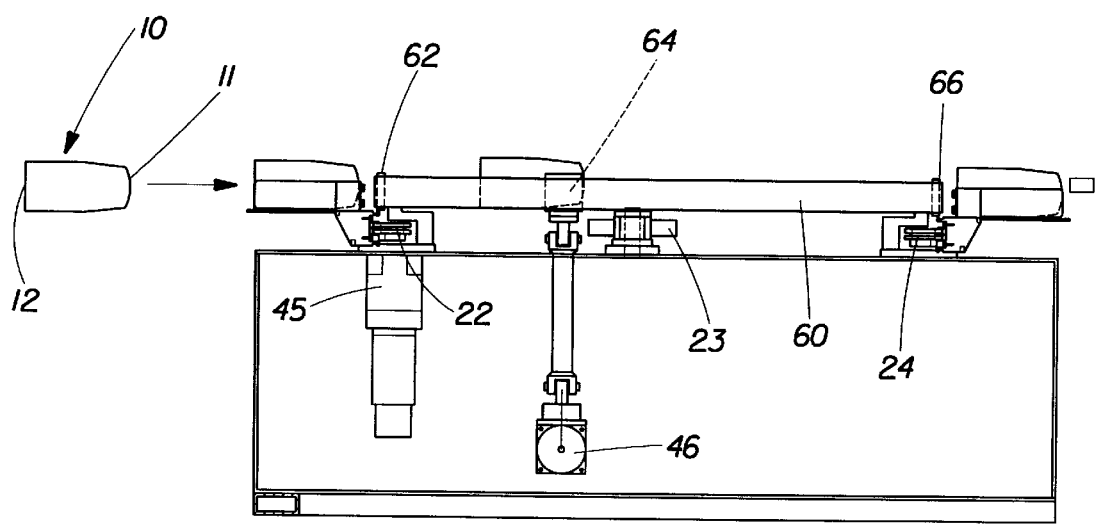
FIG. 2 is a cross-sectional view of the embodiment of FIG. 1, taken along the line 2—2 thereof.
Figure 5:
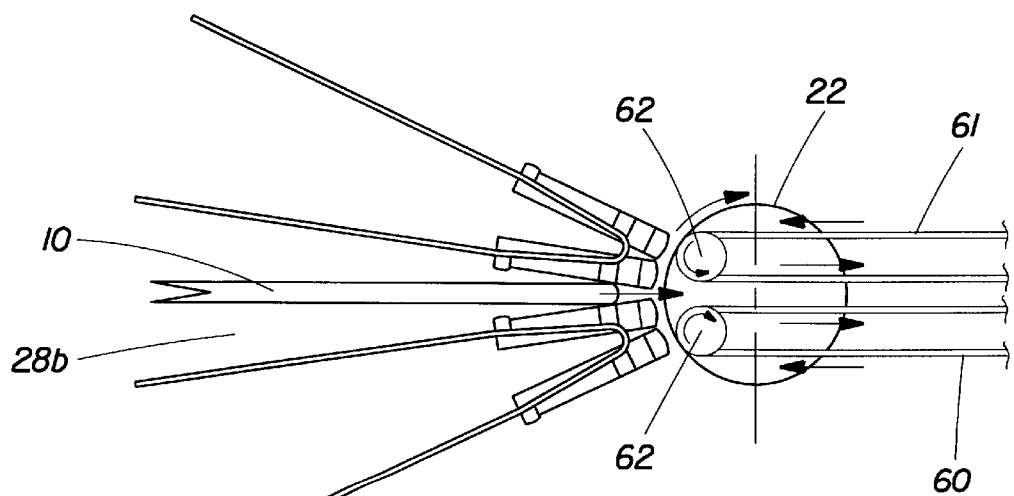
FIG. 5 is a top schematic view of a portion of four adjacent fingers of FIG. 1, wherein a diaper is positioned within a pass-through (or "open") compartment formed between a pair of adjacent fingers.

FIG. 1 is a top plan, schematic view of one embodiment of the array forming apparatus of the present invention which may be used to compile an array of diapers such as that shown in FIG. 6. The array forming apparatus generally comprises stacker 20 which is similar in many respect to stackers or accumulators already known to those skilled in the art. Such devices are typically used for forming arrays of articles (such as diapers) for subsequent packaging. Thus, as shown in FIG. 1, diapers 10 leaving the manufacturing area are transported sequentially in the direction of arrow A towards stacker 20. The diapers may be transported towards the stacker by any of a variety of well-known means, including conveyor belts. For example, diapers 10 may travel between a pair of facing, parallel conveyor belts in sequential fashion, and one exemplary device is shown in FIG. 5 of U.S. Pat. No. 4,325,475. Such conveyor devices are capable of ejecting individual diapers therefrom towards stacker 20, usually in a folded, upright position (as best shown in FIG. 2).

Stacker 20 generally comprises a plurality of fingers (or paddles) 21 which are secured to a chain 26 (or other rotating support) which is traveling in a closed loop fashion (i.e., traveling in an endless loop). The term "closed loop" simply refers to the path of travel of both chain 26 and fingers 21 attached thereto. As explained more fully below, the plane of travel for each preferably differs, however each travels along the same general closed loop path. Chain 26 extends around a plurality of rotating sprockets, and in the embodiment shown in FIG. 1 four such sprockets 22, 23, 24 and 25 are employed. One or more of the sprockets are driven by a motor, typically a servo motor in order to provide precisely controlled movement of the array forming apparatus. Thus, as shown in the cross-sectional view of FIG. 2, servo motor 45 drives sprocket 22, thereby advancing chain 26 about sprockets 22, 23, 24 and 25. Chain 26 can also be replaced by a belt (or similar device) which is tensioned about a plurality of rotating drums to provide an equivalent mechanism for advancing the fingers in a closed loop fashion.

The region between each of fingers 21 in the apparatus of FIG. 1 defines a compartment or pocket into which a diaper 10 may be fed. Diapers 10 are essentially ejected from the conveyor belt or other transport device (not shown) into compartments 28, which are defined as the regions bounded by adjacent fingers 21 and planar support surface 33 above which the fingers travel. Support surface 33 provides a surface upon which the diapers may travel while the diapers are positioned within compartments 28. Support surface 33 may be eliminated, however, when the plane of rotation of the stacker is vertical (such as that shown in U.S. Pat. No. 4,650,173). Preferably, a single diaper is deposited into each compartment 28.

Diapers are preferably fed into compartments 28 at a feed position 18 which is adjacent to the point where chain 26 rotates about feed sprocket 22. As chain 26 rotates about sprocket 22, fingers 21 will spread outwardly away from each other, thereby opening compartment 28 between the spread fingers 21, such that a diaper 10 may be readily deposited therein. As will be understood, the spreading of fingers 21 as chain 20 rotates about sprocket 22 will be enhanced as sprocket 22 is decreased in diameter. It should also be noted that fingers 21 may be replaced by individual cassettes or any of a variety of other types of compartments which may be advanced in a closed loop, preferably planar fashion by a chain, belt or other driving mechanism. Thus, the scope of the present invention is intended to include such variations. Once a diaper has been deposited into a compartment 28 formed between fingers 21 at the feed position adjacent sprocket 22, the thus deposited diaper will travel within this compartment as chain 26 is advanced in the direction shown in FIG. 1.

In the prior art apparatus and methods, subsequent diapers are similarly deposited into compartments formed between adjacent fingers, such that a plurality of diapers are deposited into the compartments in successive fashion as the chain is advanced. The deposited diapers then travel within the compartments as the chain is advanced about the various sprockets, until the compartments containing the deposited diapers reach the stripping position. Here, a movable stripper bar urges the diapers out of the compartments onto a discharge station, thereby forming an array of diapers for subsequent packaging.

As will be apparent, since all of the diapers in the prior art methods are fed into the stacker in the same orientation (usually nose forward), when the prior art stackers described above are employed, the diapers of each array will be aligned side by side in identical orientation (i.e., with the nose portion of each diaper aligned with the nose portions of the other diapers in the array). An array of articles urged from the compartments by the stripper bar will have this same aligned orientation. Since diapers are typically profiled such that the central portion is thicker than the end, the nose portion of the diapers is often significantly thicker than the tails. Therefore, if the diapers are packaged as an array of identically oriented diapers, packaging problems may result. For example, the region of the array corresponding to the tail portions of the diapers, will be significantly more compressible than the opposite region corresponding to the nose portions of the diapers. Thus, it is desirable to compile arrays of diapers wherein the orientations of the diapers in each array are alternating, as shown for array 15 in FIG. 6. Such arrays, however, cannot be formed using the stackers of the prior art.

Figure 4:
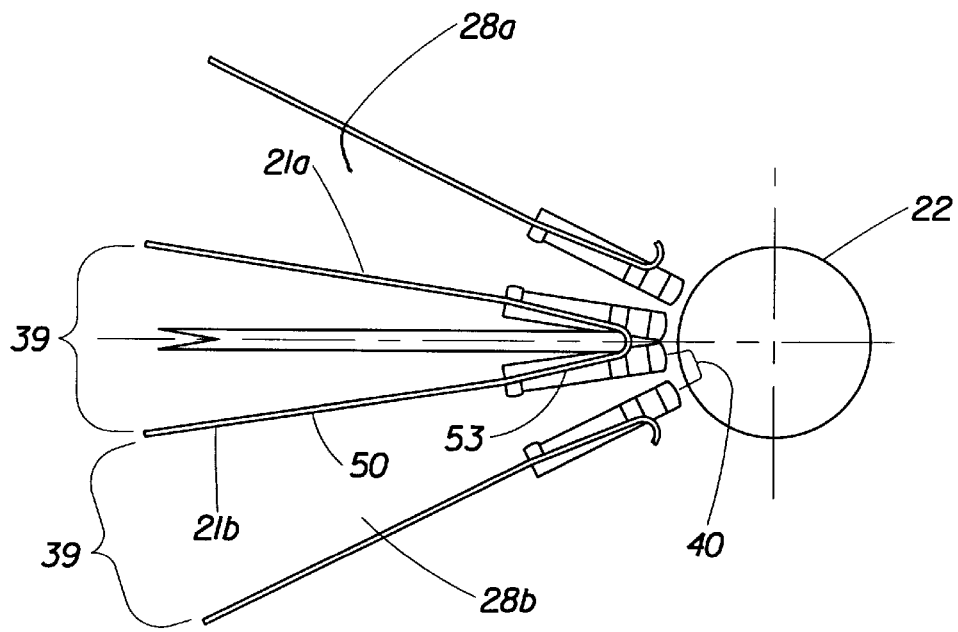
FIG. 4 is a top schematic view of a portion of four adjacent fingers of FIG. 1, wherein a diaper is positioned within a closed compartment formed between a pair of adjacent fingers.

In order to accomplish this alternating diaper orientation in the arrays, the prior art array forming apparatus described above has been modified in the manner shown in FIG. 1. Once again diapers are fed via conveyor belts or other transfer system towards feed position 18. In the apparatus of the present invention, however, not all of the diapers are deposited into compartments 28 at feed position 18. While a portion of the diapers are in fact deposited into compartments 28 in the same manner as in the prior art techniques, a portion of the diapers are introduced into compartments 28 from the "rear" of the compartment. The "rear" of each compartment 28 is defined as the region between adjacent fingers 21 which is adjacent chain 26. Thus, a first portion of the diapers are deposited through rear entrance 40 into compartments 28 (see FIG. 5), and a second portion of the diapers are deposited through entrance 39 into compartments 28 (FIG. 4). Entrance 39 is the same entry point employed in the prior art methods, and merely comprises the region between the outer edges of adjacent fingers. In either case, the leading portion of the diapers is not altered, and thus the orientation of the first portion of diapers within compartments 28 will be opposite to that of the second portion of diapers.

After the first and second portions of diapers are properly deposited into their respective compartments, the deposited diapers travel within these compartments in the same manner as in the prior art. Downstream stripper bar 27 is preferably positioned within the interior of the closed loop formed by chain 26 (when from a location orthogonal to the plane of travel of chain 26; in this case when viewed from above). Stripper bar 27 extends outwardly in the direction of arrow B in order to urge a predetermined number of diapers out of their respective compartments 28 and onto discharge station 30, thereby forming array 15 which comprises a plurality of diapers having a first portion of diapers positioned in a first orientation, and a second portion of diapers positioned in a second orientation. Preferably, the diapers alternate in orientation within array 15, as shown in FIGS. 1 and 6. Since the diapers generally extend beyond the height of fingers 21 when positioned therebetween (as best shown in FIG. 2), stripper bar 27 should be positioned slightly above the height of fingers 21. In this manner, stripper bar 27 can readily urge the diapers out of their respective compartments 28.

After array 15 has been thus formed by the stacker, it is then transported away from the stacker towards subsequent packaging operations. Transport of the array from stacker 20 may be accomplished by any of a variety of well-known means, including conveyor belts, cassette transfer systems and the like. In one example, discharge station 30 may comprise a movable platform upon which the diapers are discharged. This platform may then move out of the plane of rotation of stacker 20, thereafter presenting the array to a conveyor belt system. The conveyor belt system extracts the array from the moveable platform for transport to subsequent packaging steps. In the prior art methods, the array is transferred away from the stripper in the same direction as arrow B.

The preferred technique for depositing the first portion of diapers through the second or rear entrance 40 of each compartment 28 is to deposit these diapers into the compartments from within interior 13 of the closed loop defined by travel path of stacker 20. The term "interior of the closed loop" is meant to include the entire region bounded by chain 26 and fingers 21 when viewed from above, and is not limited, for example, to only that portion which is coplanar with chain 26. While the first portion of diapers may be passed into interior 13 and thereafter into compartments 28 through rear entrance 40 by any of a variety of means, most would require the diapers of the second portion to be diverted from its line of travel defined by arrow A. For example, the second portion of diapers could be advanced out of the plane of travel of stacker 20, and thereafter into interior 13 of the closed loop defined by stacker 20. Such variations away from a straight, planar path are disfavored, however. In order to overcome this problem, Applicants have developed finger and transfer belt designs which allow a diaper to actually pass through a compartment 28 to the interior 13 of the closed loop, and thereafter into another compartment 28 from the rear entrance thereof.

Figure 3:
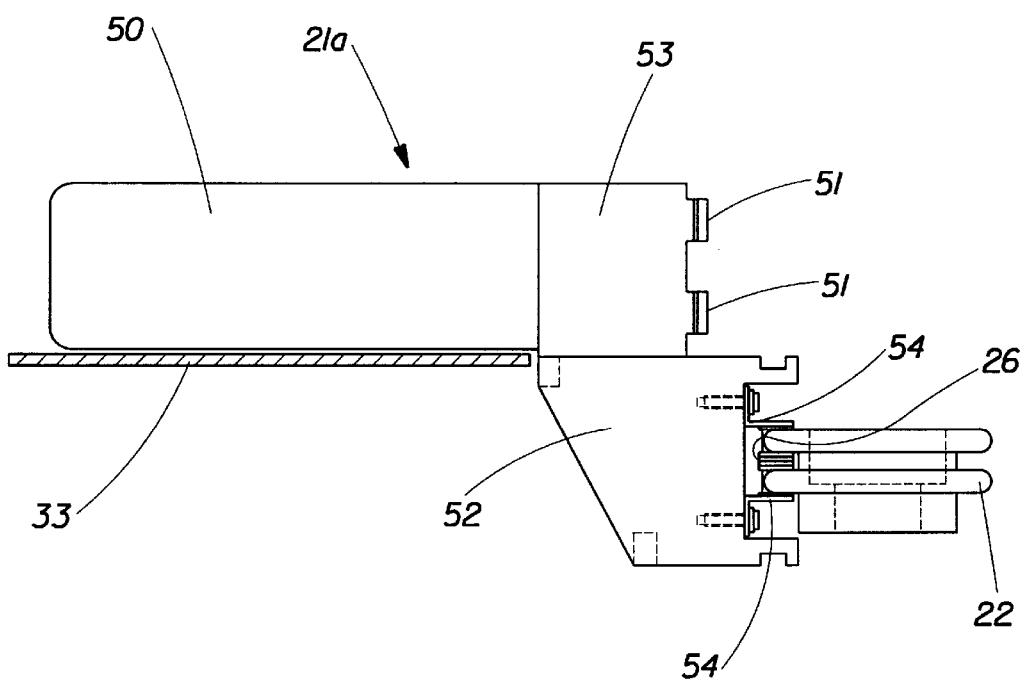
FIG. 3 is a side plan view of a finger employed in the apparatus of FIG. 1.

FIG. 3 is a side plan view of a right hand finger 21a of the present invention. Finger 21a comprises a flat, paddle-like portion 50 which is similar to prior art fingers. An angled portion 53 is positioned at one end of finger 21a, and is angled outwardly away from the plane of FIG. 3 (as best shown in the top plan view of FIG. 4). A pair of connecting elements 51 are provided at the end of angled portion 53 opposite paddle-like portion 50. As more fully described below, any of a variety of connecting elements may be employed, and in the example shown comprise a hooked extension on angled portion 53. Offset bracket 52 extends downwardly away from angled portion 53, such that angled portion 53 will be substantially below the plane of support surface 33 when finger 21a is in use. Offset bracket 52 is also secured to a link of chain 26 at a point below the lower edge of finger 21a as shown. Sprocket 22 is shown in cut-away view in FIG. 3, and cooperates with the links of chain 26 to effect movement of chain 26 and the fingers attached thereto.

Offset bracket 22 may be secured to chain 26 by a variety of means, such as angle irons 54 which are bolted to offset bracket 22, and secured to a link of chain 26 by means of a pin extending through the link and the angle irons. As will be understood, it is also not necessary for each finger 21 to be attached to chain 26, since only one of a pair of connected fingers 21 must be connected to chain 26. It is preferred, however, that each finger 21 be attached to chain 26 or other movable support.

As shown in FIG. 4, a left-hand finger 21b is also provided, and fingers 21a and 21b are preferably secured to chain 26 in alternating fashion. Left-hand finger 21b is a mirror image of right-hand finger 21a in that its angled portion 53 extends in a direction opposite to that of angled portion 53 of finger 21a. In addition, the connecting elements on finger 21b are configured so as to pivotally attach to the corresponding connecting elements on finger 21a. The attachment should be capable of pivoting much like a door hinge so that adjacent and connected fingers can pivot away from each other as the chain passes about a sprocket. In fact, while it is preferred that the angled portions of adjacent fingers 21a and 21b be hingedly connected to one another, the means by which this hinged connection is accomplished may vary considerably. When the simple hooked extension connecting elements 51 on finger 21a are employed, the connecting elements on finger 21b may comprise simple slots through which connecting elements 51 extend. Other hinged connectors known to those skilled in the art may also be readily employed. Alternatively, fingers 21a and 21b may be integrally formed with one another such that a single metal strip forms both fingers (after the appropriate bends in the metal strip have been created). Such a configuration is shown in FIGS. 4 and 5, and it is further preferred in this embodiment that the juncture of fingers 21a and 21b comprise a flexible bend so that the connected fingers can pivot away from each other as the chain passes about a sprocket. Flexibility in this region may be enhanced by employing a metal strip which is thinner in this region.

Since right- and left-hand fingers 21a and 21b are connected to chain 26 in alternating fashion, two distinct varieties of compartments 28 are provided. In the region between adjacent connected fingers 21a and 21b, a "closed" compartment 28a is provided. Compartment 28a is termed closed, since a diaper can only be deposited into compartment 28a through entrance 39. The angled portions 53 and connecting elements 51 act to close off the rear portion of compartment 28a (i.e., the portion adjacent chain 26). Compartment 28b, on the other hand, comprises the region between adjacent fingers which are not connected to each other at angled portions 53. In this fashion, a diaper can be deposited into compartments 28b through either entrance 39 or rear entrance 40. Rear entrance 40 is not blocked by any connection between adjacent fingers, nor is it blocked by chain 26 because of the offset provided by offset brackets 52. Each compartment 28 resides in a plane different from the plane of rotation of chain 26. In the preferred embodiment, compartments 28 are positioned above chain 26 and the sprockets about which it is advanced.

The above finger configuration allows diapers to be deposited from the diaper transport conveyor alternately into compartments 28a and 28b. When a diaper is ejected from the transport conveyor into a compartment 28a, the joined angled portions 53 of the adjacent fingers will halt movement of the diaper at the rear of the compartment adjacent and above chain 26, thereby ensuring that the diaper remains within compartment 28a as shown in FIG. 4. It should be noted that the details of sprocket 22 and the inner loop conveyor system (to be described) have been omitted from FIG. 4 for purposes of clarity. The diapers deposited within compartments 28a are then transported around stacker 20 by means of chain 26 in the same manner as the prior art techniques. When a diaper is ejected or deposited into a compartment 28b, however, the rear entrance to the compartment is open. Thus, if a diaper is ejected from the transport conveyor into an open compartment 28b with sufficient force, the diaper will pass through rear entrance 40 of compartment 28b as shown in FIG. 5.

Within the interior of the closed loop defined by stacker 20, an inner loop conveyor system is provided. The inner loop conveyor system accepts diapers which are urged completely through a compartment 28b, and transports these diapers through the interior 13 of the closed loop defined by stacker 20, and thereafter deposits each of these diapers into another compartment 28b through its rear entrance. Preferably, the inner loop conveyor system transports the diapers to the opposite side of the closed loop along a substantially straight line of travel.

In the preferred embodiment, therefore, diapers 10, each having an identical orientation (preferably nose forward), are presented to stacker 20 by a diaper feed conveyor system as described previously. Diapers are alternately deposited into a closed compartment 28a and an open (or "pass-through") compartment 28b, since the finger/chain combination is advancing about the sprockets. The diapers deposited in closed compartments 28a remain therein, and travel about a portion of the closed loop with the finger/chain combination as described previously. The diapers ejected into open compartments 28b at feed position 18, on the other hand, pass completely therethrough and are captured by the inner loop conveyor system. The diapers passing through interior 13 of the closed loop are thereafter ejected by the inner loop conveyor system, through the rear entrance 40 of a second compartment 28b located at inlet position 19. In the embodiment of FIG. 1, inlet position 19 is positioned directly opposite feed position 18, thereby simplifying inner loop diaper passage The inner loop conveyor system deposits the pass-through diapers into every other compartment (namely compartments 28b) at inlet position 19, since the other compartments at inlet position 19 will comprise a closed compartment 28a already containing a diaper. As will be apparent, the diapers in closed compartments 28a at inlet position 19 have undergone a 180° rotation, while the "pass-through" diapers have not. Thus, beyond inlet 19, the diapers will be positioned within the compartments of stacker 20 in alternating orientations (e.g., alternating between nose forward and nose trailing orientation). An array of diapers having alternating orientations may then be removed from stacker 20 in the manner described previously.

The inner loop conveyor system preferably comprises a pair of transfer belts 60 and 61 which are each separately tensioned about a plurality of rotatable drums 62–66. The configuration shown is but merely one preferred embodiment, and numerous other drum positions may be used. Transfer belts 60 and 61 should, however, be positioned in a close, facing relationship so that a diaper will be transported between belts 60 and 61 when the belts are rotated about said drums as shown in FIG. 5. Such transfer belt arrangements are well known in the art, and need not be described in great detail herein. As shown in FIG. 2, a second servo motor 46 may be used to drive drums 64. Preferably, a single servo motor 46 drives both belts in order to ensure uniform belt speed. Thus, servo motor 46 should be linked by appropriate gearing to both drive drums 64.

Drive drums 64 should be driven in opposite directions, so that the portions of belts 60 and 61 which are immediately adjacent to one another will travel in the same direction as best shown in FIG. 5. Likewise, all of the other rotatable drums, namely 62, 63, 65 and 66 will each rotate in a direction opposite to that of the correspondingly numbered drum associated with the opposite belt. For example, drum 63 associated with first transfer belt 60 will rotate counter clockwise, while the drum 63 associated with second transfer belt 61 will rotate in a clockwise fashion. In this manner, when a diaper 10 is ejected or deposited into an open compartment 28b, and passes through rear entrance 40 of the compartment, the diaper will be snared by advancing belts 60 and 61. Thereafter, the diaper will be transported between belt 60 and 61 as shown in FIG. 1, towards inlet position 19. The distance between belts 60 and 61 in the region wherein the diapers will travel should be chosen so as to provide for diaper transport without damaging the diapers. In this manner, it will be readily apparent that the inner loop conveyor system of the present invention is similar to the transport conveyors of the prior art used to feed diapers into stackers.

Since inner loop conveyor system described above will essentially eject each diaper into a compartment 28b through its rear entrance 40, a means for preventing overshoot of the compartment should be provided. Thus, a stop bar 70 is preferably positioned adjacent the entrance 39 of the compartments located at inlet position 19. Stop bar 70 merely prevents further travel of the diapers ejected from the inner loop conveyor system beyond there respective open compartments 28b.

The process of passing a diaper completely through every other compartment and the interior of the loop will generally take a longer period of time than that needed for merely seating a diaper within a closed compartment 28a. This time variance can be problematic when attempting to optimize the speed of stacker 20. Variations in diaper flow to stacker 20 can exacerbate this problem. In order to overcome these problems and account for any timing differences, the inner loop conveyor system is preferably pivotable so as to direct diapers into the proper compartment which is not already occupied by another diaper. As shown in FIG. 1, the inner looper conveyor system comprising transfer belts 60 and 61 and their respective drums about which they are tensioned, may be pivoted about an axis corresponding to the axis of sprocket 22 at feed position 18. A third servo motor 47 is employed to drive armature 48 in order to effect movement of the portion of inner loop conveyor system adjacent inlet position 19 as indicated by arrow C. In other words, the point from which diapers exit from between transfer belts 60 and 61 may be pivoted so as to direct the pass-through diapers into the appropriate compartment. Preferably, the point of ejection (i.e., the portion of belts 60 and 61 adjacent inlet position 19) tracks the movement of the open compartment 28b into which the next diaper is to be ejected, thereby ensuring proper diaper depositing. The pivoting action of the inner loop conveyor system can even be combined with lateral movement of sprockets 24 and 25 to provide precise control of the array forming process of the present invention.

It should also be noted that an additional advantage of the apparatus of the present invention is that the apparatus can be configured so as to permit every diaper to pass through the interior of stacker 20. The diapers may be passed through alternating compartments 28b, or the fingers may even be modified such that all have an open configuration having a rear entrance 40. By allowing all of the diapers to pass through, the orientation of the diapers in the array urged from the stacker will all be equivalent to each other, but opposite to the orientation typically provided by the prior art techniques which cause the diapers to be rotated 180° by means of the stacker. In addition, open compartments 28b need not alternate precisely with closed compartment 28a, as it may be desirable to provide arrays having a plurality of diapers in a first orientation positioned adjacent one another. Such modifications, however, are well within the scope of the present invention.

The foregoing description of preferred embodiments is by no means exhaustive of each and every variation of the present invention which is possible, and has therefore only been presented for purposes of illustration and description. Modifications and variations in the above-described embodiments will be apparent to those skilled in the art in light of the teachings herein, and these modifications and variations are well within the scope of the present invention. For example, although the apparatus and methods of the present invention have been described using diapers, these apparatus and methods are equally applicable to adult incontinence pads as well as various other types of articles which are to be collated into arrays. Thus, it is intended that the scope of the present invention be defined by the claims appended hereto, and not by the specific embodiments shown in the drawings or described above.

We claim:

1. A method of forming arrays of articles, said method comprising:
    (a) providing a stacker having a plurality of compartments for receiving said articles, said stacker traveling along a closed loop path;
    (b) transporting a plurality of said articles along a first path towards said stacker in sequential fashion;
    (c) introducing said articles into said compartments at a first inlet position located adjacent to the interior of said closed loop path; and
    (d) removing an array of said articles from said stacker at a stripping location located downstream from said inlet position.

2. The method of claim 1, wherein a first portion of said articles are introduced into said compartments at said first inlet position and further comprising the step of introducing a second portion of said articles into said compartments at a second inlet position.

3. The method of claim 2, wherein said array comprises said first and second portions of said articles, and wherein the articles of said first portion are positioned in said array in an orientation opposite to that of the articles of said second portion.

4. The method of claim 2, wherein each of said compartments has a first entrance, and at least a portion of said compartments further has a second entrance, such that said first portion of articles are introduced into said compartments through said second entrances and said second portion of articles are introduced into said compartments through said first entrances.

5. The method of claim 1, wherein said stacker comprises a plurality of outwardly extending fingers traveling along said closed loop path, and wherein said compartments comprise the region between adjacent fingers.

6. The method of claim 5, wherein each article of said first portion is introduced into a compartment by urging said article from said first path, completely through a compartment having both first and second entrances, and thereafter into another compartment located at said first inlet position.

7. The method of claim 6, wherein each article of said first portion is urged into a compartment located at said first inlet position by a conveyor system which transports said article through the interior of said closed loop path.

8. The method of claim 5, wherein said stacker further comprises an advanceable support to which said fingers are secured, said advanceable support advancing along said closed loop path in a plane different from the plane of travel of said fingers.

9. The method of claim 8, wherein each of said compartments has a first entrance, and at least a portion of said compartments further has a second entrance, said second entrances defined by the region between adjacent fingers located proximally to said advanceable support, said first entrances defined by the region between adjacent fingers located distally to said advanceable support, and wherein said first portion of articles are introduced into said compartments through said second entrances.

10. The method of claim 9, wherein said array of articles is removed from said stacker by urging said array out of said compartments through said first entrances.

11. The method of claim 1, wherein said articles are chosen from the group consisting of diapers and adult incontinence pads.

12. An apparatus for forming arrays of articles for subsequent packaging, comprising:
    (a) a continuous stacker having a plurality of compartments for receiving said articles, said compartments advanceable along a closed loop path;
    (b) a conveyor system for transporting a plurality of said articles into said compartments at a first inlet position located adjacent to the interior of said closed loop path; and
    (c) a stripper for urging an array of articles out of said compartments, said stripper located downstream of said first inlet.

13. The apparatus of claim 12, wherein at least a portion of said compartments have first and second entrances, and said conveyor system is configured such that an article which is urged into a compartment through its first entrance and thereafter out of the compartment through its second entrance will be presented to said conveyor system for transport to said first inlet position.

14. The apparatus of claim 13, wherein said conveyor system is positioned so as to transport said articles through at least a portion of the interior of said closed loop path.

15. The apparatus of claim 12, wherein said stacker comprises a plurality of outwardly extending fingers secured to an advanceable support, said compartments comprising the region between adjacent fingers.

16. The apparatus of claim 15, wherein each of said compartments has a first entrance, and at least a portion of said compartments further has a second entrance, said second entrances defined by the region between adjacent fingers located proximally to said advanceable support, said first entrances defined by the region between adjacent fingers located distally to said advanceable support and wherein said conveyor system is configured so as to transport said articles into said compartments at said first inlet position through said second entrances.

17. The apparatus of claim 15, wherein said advanceable support comprises a chain, said chain advanceable along a plane different from that of said compartments.

18. The apparatus of claim 15, wherein a portion of said fingers are each attached to an adjacent finger, such that each compartment defined by the region between adjacent fingers which are attached to one another lacks said second entrance.

19. The apparatus of claim 18, wherein said fingers are attached to said advanceable support by means of an offset bracket, and wherein said second entrance is positioned proximal to said advanceable support.

20. The apparatus of claim 12, wherein said conveyor system comprises a pair of advanceable belts positioned in facing relationship along a portion of their lengths, such that said articles may be transported to said first inlet position between said belts.

21. The apparatus of claim 16, wherein said stripper is configured so as to urge said articles out of said compartments through said first entrances.

22. A method of forming arrays of articles, said method comprising:
   (a) providing a stacker having a plurality of compartments for receiving said articles, said stacker traveling along a closed loop path, each of said compartments having a first entrance and at least a portion of said compartments having a second entrance;
   (b) transporting a plurality of said articles along a first path towards said stacker in sequential fashion;
   (c) introducing a first portion of said articles into said compartments through said second entrances at a first inlet position, and introducing a second portion of said articles into said compartments through said first entrances at a second inlet position; and
   (d) removing an array of said articles from said stacker at a stripping location located downstream from both of said inlet positions.

23. The method of claim 22, wherein said array comprises said first and second portions of articles, and wherein the articles of said first portion are positioned in said array in an orientation opposite to that of the articles of said second portion.

24. The method of claim 22, wherein each article of said first portion is introduced into a compartment by first urging said article from said first path, completely through a compartment having both first and second entrances, and thereafter into another compartment located at a first inlet position.

25. The method of claim 24, wherein each article of said second portion is introduced into a compartment at a second inlet position which is upstream from said first inlet position along said closed loop path.

* * * * *